United States Patent [19]

Gutow

[11] 4,328,057

[45] May 4, 1982

[54] METHOD AND APPARATUS FOR FORMING WINDOWED PRESSURE SENSITIVE LABELS

[75] Inventor: Bernard S. Gutow, San Carlos, Calif.

[73] Assignee: H. S. Crocker Co., Inc., San Bruno, Calif.

[21] Appl. No.: 163,304

[22] Filed: Jun. 26, 1980

[51] Int. Cl.[3] .............................................. B32B 31/00

[52] U.S. Cl. ..................................... 156/248; 40/2 R; 193/11; 156/268; 156/289; 156/513; 156/584; 406/47; 428/40

[58] Field of Search ............... 156/247, 248, 268, 289, 156/344, 513, 529, 537, 584, DIG. 31; 193/11; 406/46, 47; 428/40, 41, 43; 40/2

[56] References Cited

U.S. PATENT DOCUMENTS 396,401 1/1889 Hall ........................................ 193/11
636,825 11/1899 Maurer .................................. 193/11
2,985,554 5/1961 Dickard .............................. 156/289
3,507,740 4/1970 Gaspari ................................. 428/41
3,661,679 5/1972 Law .................................... 156/529
4,013,497 3/1977 Wolf .................................... 156/344
4,246,058 1/1981 Reed .................................... 156/248

*Primary Examiner*—John E. Kittle
*Attorney, Agent, or Firm*—Wood, Herron & Evans

[57] ABSTRACT

A method and apparatus for forming a pressure sensitive label on a backing web, wherein at least one "window" area is cut within the label's perimeter but the backing web is not cut. The slug which is cut to form the label's window area is thereafter peeled from the backing web and carried off through a vacuum take-off line for disposal as scrap. At the time of slug removal the pressure sensitive adhesive on the slug and/or the vacuum take-off line is treated with an adhesive-deadening substance to minimize the tendency of the slugs to adhere to one another and to the take-off equipment.

18 Claims, 3 Drawing Figures

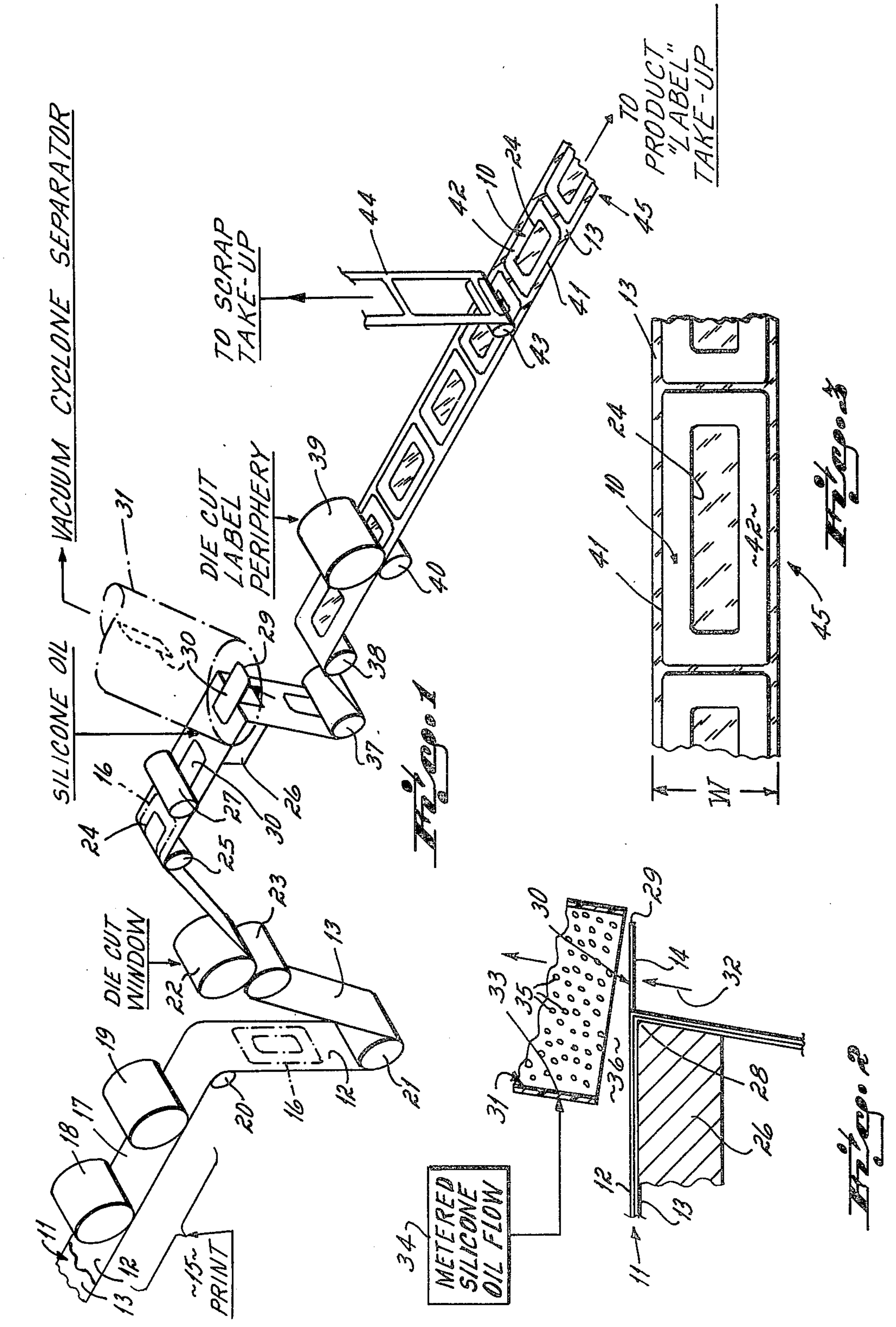
VACUUM CYCLONE SEPARATOR
SILICONE OIL
DIE CUT WINDOW
DIE CUT LABEL PERIPHERY
TO SCRAP TAKE-UP
TO PRODUCT "LABEL" TAKE-UP
PRINT
METERED SILICONE OIL FLOW

METHOD AND APPARATUS FOR FORMING WINDOWED PRESSURE SENSITIVE LABELS

FIELD OF THE INVENTION

This invention relates to method and apparatus for forming labels. More particularly, this invention relates to the forming of a windowed pressure sensitive label, i.e., a label with a cutout area or window within the label's perimeter.

BACKGROUND

In the prior art, it has heretofore been the practice to make windowed pressure sensitive labels, on a production basis, by forming a series of labels in succession from a long strip of adhesive coated paper or label stock which is removably adhered or laminated to a non-adhesive backing web. Each label's window area is cut or punched through the adhesive coated label web, and through the backing web as well. Because each separate "slug" so formed is a laminate comprised of a label web section and a backing web section, the pressure sensitive adhesive is not exposed; and thus the separate slugs can be removed individually and disposed of as scrap without sticking together. The outside perimeter of each label is defined by die cutting through the pressure sensitive adhesive web, but not through the backing web, so that the backing web remains continuous and intact. The "ladder" shaped scrap formed from the pressure sensitive label web that is defined when each label's outside perimeter is cut out, is peeled off and removed. Although its adhesive surface is exposed, its removal presents no sticking problem because it can be pulled off and reeled as an essentially continuous strip. Thus, a series of individual pressure sensitive labels on the backing web is formed. The individual labels with the windows cut through them can be then peeled from the backing web strip and applied individually. The essentially endless window label-carrying strip or laminate so formed is wound on spools for shipment and storage, in rolls usually comprising many thousands of labels.

THE PROBLEM IN THE ART

Experience has shown that an endless window label web and backing web laminate formed and spooled in the manner just described exposes the individual labels to damage, by bending or creasing across the label windows. Sidewise impact on a roll of such prior art windowed labels may cause labels on the roll to bend or crease, especially on a longitudinal line through the labels' windows. Although the backing web carries and surrounds the label area, it provides no support in the window areas because those areas of the backing web also have been removed or punched out. It is thus relatively easy for the backing web, and therefore the labels, to crease or bend along the windows' longitudinal axes, even though the labels are supported on the backing web. This creasing or bending of windowed labels, even though slight in appearance, causes substantial problems in the subsequent automatic application of the labels to manufactured products. The individual labels are usually applied at high rates from the spools by automatic equipment; creased window labels cause irregularities which lead to equipment jamming, label misapplication, and so on, all of which can result in undesirably high end product rejection rates.

SUMMARY OF THE INVENTION

In attempting to overcome the label creasing or bending problem described above, it was found that the resistance to creasing or bending of window labels is improved if the window area was cut through the pressure sensitive adhesive web layer only, while leaving the backing web intact. This imparts sufficient additional resistance to label creasing or bending that the incidence of the problem is greatly reduced. However, removal of the pressure sensitive adhesive-coated slugs cut out of the label web then presents a serious operating problem during high speed window label production. The window slugs are separate from each other and from the backing, and the adhesive on the back surface of each slug has been exposed by removal of the slug from the backing web. The removed slugs, therefore, tend to stick to one another, and tend to stick to the slug removal or take-off equipment, often requiring frequent shutdown and clean out, even shortly after start up, thereby imposing serious time delays during a production run.

Accordingly, it has been the objective of this invention to provide an improved method and improved apparatus for cutting and removing discrete pressure sensitive adhesive coated slugs from an adhesive coated web which is removably laminated to an endless backing web strip, which method and apparatus minimize the clogging of slug take-off equipment that would otherwise result due to sticking of the individual separate slugs to one another and to the equipment.

In accordance with this invention, individual windowed labels are formed from pressure sensitive label web stock that is laminated to an essentially endless backing web in strip form. Each label's window area is defined by cutting through the label web so as to leave the backing web intact, i.e., not cut through. The window areas or slugs are then removed from the label web and from the backing web by running the web laminate strip over a "breaker" edge in a direction parallel to the longitudinal axis of the strip. The breaker edge causes the leading edge of each slug to delaminate or peel away from the backing web. Removal of the slugs is assisted by a vacuum take-off line positioned adjacent the breaker edge where the window slugs are delaminated from the backing web. The slugs are thereafter removed from the take-off location by the vacuum take-off line.

Clogging of the take-off line with the slugs, which otherwise would occur frequently, is substantially prevented by injecting or flowing an adhesive deadening substance, e.g., a fluent material such as an oil in mist or droplet form, at a slow rate into the vacuum take-off line adjacent the slug removal location. This has been found to have two adhesive deadening effects. The adhesive "killer" tends to coat the window slugs themselves, including the pressure sensitive adhesive back face of the slugs, and thereby effectively "deadens" or kills the exposed adhesive so as to prevent the slugs from significant sticking to one another. The adhesive deadening substance also tends to coat the interior surface of the take-off line downstream of the slug injection point, thereby preventing significant adherence of the slugs to the inside of the take-off line. The take-off line may carry the slugs to a cyclone separator where they are disentrained from the air stream and are dumped into a waste collection drum.

In the preferred embodiment, after the slugs have been removed from the label web the external peripheries of the labels are then defined in the label web, again but cutting through the adhesive coated label web only and without cutting through the backing web. This leaves an endless "ladder-shaped" strip of waste material surrounding the individual labels. The ladder-shaped strip, because it is endless, can be continuously peeled off the backing web without clogging, thereby leaving discrete separable pressure sensitive window labels proximate to one another on the backing web. The label and backing web laminate then can be rolled up on a spool as desired. The continuous or endless backing web which supports the labels, without holes or cutouts in it, is sufficiently resistant to prevent the creasing or bending which otherwise would occur, as already noted. Window labels formed in this manner may be applied for example to tape cassettes, a label's window exposing the cassette's reels for engagement with a tape player's drive spindles during installation of the cassette with the player.

Other objectives and advantages of this invention will be apparent from the following detailed description taken in conjunction with the drawings.

DESCRIPTION OF THE DRAWINGS

FIG. 1 is a perspective schematic view illustrating both method and apparatus for forming pressure sensitive window labels in accordance with a preferred embodiment of this invention;

FIG. 2 is an enlarged diagrammatic view illustrating the method and apparatus at that area where window slugs are removed from a backing web; and;

FIG. 3 is a top view illustrating a series of pressure sensitive window labels in series on a backing web after forming but prior to spooling.

DETAILED DESCRIPTION

The preferred method and apparatus for forming pressure sensitive window labels 10 is illustrated schematically in FIG. 1. Initially there is provided as a feedstock a conventional web laminate 11 in strip form, comprised of a label web 12 which may be paper, and a backing web 13. The label web 12 is provided with a pressure sensitive adhesive on its underface 14 (see FIG. 2), which removably adheres the label web 12 to backing web 13. With the backing web 13 and label web 12 so provided in laminate 11 form, the laminate is directed through a printing sequence generally indicated at 15, in which a series of successive labels are printed (one of which is denoted by phantom lines 16) on the top or exposed face 17 of the label web by printing mechanism illustrated diagrammatically by printing rolls 18, 19. Two color printing is illustrated, but more or fewer colors may be used. The label printing is usually provided on the label web 12 before any cutting of that web at all. The printed web laminate 11 is therafter passed around successive guide rollers 20, 21.

After the web laminate 11 has been printed, it is passed through die cutting rollers 22, 23. At the die cut rollers 22, 23, the window 24 area of each label 16 is cut only into the label web 12 by the die cutting technique; that is, the backing web 13 is not cut, or is not cut through. In other words, the window 24 area of each finished label 10 is cut inside the label's perimeter 16 without cutting the backing web 13, to form a window slug 30. Subsequently, the web laminate 11 passes over transfer roller 25 and into slug take-off equipment that includes a fixed stripper platen 26. A floating pressure roller 27 rides on top of the web laminate or strip 11, between the transfer roller 25 and the stripper platen 26, in order to insure web tautness as the strip 11 passes over the platen. The stripper platen 26 is preferably configured, as shown in FIG. 2, to provide an acute angled breaker edge 28 over which the web laminate 11 is drawn. It is at this acute angled breaker edge 28 that the leading edge 29 of each window slug 30, previously die cut out of the label web 12, is delaminated or peeled away from the backing web 13 as shown in FIGS. 1 and 2.

The delamination or peeling away of each label's slug 30 from the backing web 12 is assisted by other slug take-off equipment that includes a "vacuum" or air current take-off line 31 positioned adjacent the platen's breaker edge 28 immediately above the label web 12 as shown in FIGS. 1 and 2. A vacuum, such as may be drawn by further slug take-off equipment that includes a cyclone separator (not shown) connected downstream to the vacuum take-off line 31, induces a positive air flow (as shown by phantom arrows 32) from beneath the slug 30 toward and into the take-off line. This positive air flow 32 tends to assist the delamination or peeling of the entire slug 30 from the backing web 13 as the label web 12 and backing web 13 pass over the breaker edge 28.

Each slug 30, as peeled off the backing web 13, presents its pressure sensitive adhesive undersurface 14 which is exposed to the inside 33 of the vacuum take-off line 31, as well as to other slugs being carried off. It is the pressure sensitive adhesive on exposed faces 14 of the separated slugs 30 that, without this invention, would cause those slugs to become clogged within the take-off line 31 due to adherence of the slugs to the take-off line's inside surface 33 and/or to slug adherence one to another. Clogging of the vacuum take-off line 31 would quickly reduce or cut off the vacuum established in that line by the cylcone separator (not shown), thereby shutting down the vacuum take-off line 31 and causing stoppage of the label forming method.

This invention overcomes the clogging problem, however, by introducing an adhesive deadening substance 35 into the take-off line 31 immediately adjacent the platen's breaker edge 28, i.e., immediately adjacent that area 36 where each slug 30 is removed from the backing web 13. This adhesive deadening substance 35 is preferably a liquid in the form of an oil, most preferably a silicone oil. Of the many suitable oils, one example is "1107 Fluid" silicone oil produced by Dow Corning Co.

The fluid may be introduced through a metering device 34 into the vacuum take-off line 31, in drop or mist form. Because the take-off line 31 induces air flow 32 through that line from the slug removal 36 area toward a downstream cyclone separator (not shown), the fluid 35 so introduced tends to coat the slugs 30 drawn into the vacuum take-off line, as well as to coat the inside surface 33 of the vacuum take-off line. (To further reduce the likelihood of sticking, it is desirable to use a take-off line which has a Teflon coated inside surface 33.) The coating provided to the slugs 30 and the inside surface 33 of the vacuum take-off line 31, i.e., the fluid introduced into the take-off line, should be injected at a rate sufficient to deaden or kill the pressure sensitive adhesive characteristics of the pressure sensitive adhesive coated on face 14 of each slug to the extent necessary to prevent the clogging problem. In other words, sufficient adhesive deadening substance is introduced to substantially prevent the slugs 30 from sticking one to the other, and to substantially prevent the slugs from sticking to the inside surface 33 of the vacuum take-off line 31. This procedure substantially eliminates the clogging problem which would be experienced if no adhesive deadening substance was used.

Oils tend to be more suitable than dry powders for this purpose because they demonstrate higher wettability for the adhesive. Light hydrocarbon oils display good wetting of the adhesive; but if drippage occurs onto the label strip, such oils may interact with the label ink and thereby damage the label. The silicone oils also have good ability to wet the adhesive, moreover any drippage of such oils does not damage the labels. For this reason the silicone oils are preferred as the fluent adhesive deadening substance. Small oil injection rates have been found sufficient; for example the "1107" oil identified above is useful even at rates as low as 1 pint/12,000 linear feet of a strip which is four labels wide.

After the slugs 30 have been removed from the backing web 13, the label web (with windows 24 formed therein) passes beneath guide rollers 37, 38 and thereafter through die cut rollers 38, 40. At die cut rollers 39, 40, the outside perimeter or periphery 41 of each label 10 is cut through the label web 12 only, again without cutting through the backing web 13. As a result, after the labels 20 have passed through the second die cut roller 39, 40 step, the inside 24 and outside 41 periphery of the final windowed label 10 have been formed, the label 10 has been printed on its exposed face 42, and the slug 30 within the label's windowed area has been removed, as previously noted. Subsequent to the second die cut roller 39, 40 step, the cut label web 12 and the backing web 13 pass beneath a take-off roller 43 at which the ladder or lattice shaped scrap web 44 defined from the label web by the die cut rollers 39, 40 is removed and wound up on a scrap take-up roll (not shown) as shown in FIG. 1. This then leaves the discrete, individually separable labels 10 on the backing web 13 with no slug 30 within the label's windowed area and no lattice or ladder scrap 44 between successive labels. The final multi-label and backing web laminate 45, as shown in FIG. 3, is thereafter wound up on a label take-up spool in roll form until use of the labels 10 is desired.

Although the description of the method and apparatus herein has been made in connection with a label or strip web 12 and a backing web 13 of width W sufficient to accommodate only a single label 10, it should be understood by those skilled in the art that the width of the web laminate 11 may be such as to accommodate three or four or more labels across the width thereof. It is contemplated, in this multi-label width emobdiment, that the individual or single label-width finished web 45 would be slit from the multi-label width web after the lattice or ladder shaped scrap web has been removed from the multi-label width backing web, but prior to rolling up the finished product web 45 laminate on a storage spool.

Having described in detail the preferred embodiment of my invention, what is desired to be claimed and protected by Letters Patent is:

1. A method of making pressure sensitive, windowed labels from a label web which is removably adhered by a pressure sensitive adhesive to a backing web, and wherein said label web is cut to provide a series of discrete separable labels while carried on said backing web, said method comprising the steps of, forming at least one window in each respective label but without cutting through the backing web underlying it, thereby defining a series of separate, removable, pressure sensitive adhesive coated slugs adhered on the backing web within the areas of the windows, and removing each slug from the backing web underlying it through use of take-off equipment but without removing any said labels from said backing web, while treating said slugs and said take-off equipment with a fluent adhesive deadening substance to lessen the adhesive characteristics of said pressure sensitive adhesive, thereby reducing clogging of said take-off equipment with said slugs after said slugs have been removed from said backing web, the slug being formed and removed from the backing web before the respective label is defined on the web by cutting around the exterior perimeter of that label.

2. The method of claim 1, said removing step comprising the steps of exposing said label web to an air current, removal of said slugs from said backing web being at least partially assisted by said air current, and directing said slugs away from said backing web through use of a take-off line that comprises at least a part of said take-off equipment, said air current being directed into said take-off line for carrying said slugs away from said backing web.

3. The method of claim 2, said treating step comprising the step of metering said adhesive deadening substance into said air current at a rate sufficient to effectively prevent sticking of said slugs to said take-off line.

4. The method of claim 3 wherein said adhesive deadening substance is a liquid.

5. The method of claim 4 wherein said liquid is an oil.

6. The method of claim 5 wherein said oil is a silicone oil.

7. The method of claim 3, said treating step comprising the step of introducing said substance into said take-off line just downstream of the slug intake to said line.

8. The method of claim 3, said removing step comprising the step of bending said backing web over a breaker edge to separate initially each slug from said backing web.

9. The method of claim 3, said method comprising the further step of forming an exterior perimeter for each label by cutting said label web only and without cutting through said backing web, thereby defining a series of discrete separable labels on said backing web.

10. A method of forming a window in a pressure sensitive adhesive coated web that is removably adhered to a backing web, said method comprising the step of cutting a window in said coated web but without cutting through said backing web, thereby defining a removable pressure sensitive adhesive coated window slug on the web, removing said window slug from said backing web through use of take-off equipment without removing any of the rest of said coated web from said backing web, and treating at least one of said slug and said take-off equipment with an adhesive deadening substance to lessen the adhesive characteristics of said pressure sensitive adhesive on said slug, thereby tending to prevent clogging of said take-off equipment with said slug after said slug is removed from said backing web.

11. The method of claim 10, said removing step comprising the steps of exposing said coated web to an air flow, removal of said slug from said backing web being at least partially assisted by said air flow, and directing said slug away from said backing web by a take-off line that comprises at least a part of said take-off equipment, said air flow being directed into said take-off line for carrying said slug away from said backing web.

12. The method of claim 11, said treating step comprising the step of metering said adhesive deadening substance into said air flow at a rate sufficient to prevent sticking of said slug to said take-off line.

13. The method of claim 12 wherein said substance is a liquid, and said treating step comprising the step of introducing said liquid into said vacuum take-off line just downstream of the slug intake to said line.

14. The method of claim 12, said removing step comprising bending said backing web over a breaker edge to separate initially said slug from said backing web.

15. Apparatus for removing a portion of a pressure sensitive adhesive coated web that is laminated to a backing web, said apparatus comprising window forming means for defining separate slugs on said coated web by cutting through said coated web only but without also cutting through said backing web, a take-off line situated proximate to the removal location of each said slug from said backing web, air means for providing an air flow into an intake of said take-off line to aid in introducing said slug into said take-off line, adhesive deadener means for injecting an adhesive deadener substance into the air flow carrying said slug, and perimeter forming means for defining separate sections on said coated web by cutting through said coated web without cutting through said backing web, thereby defining a series of discrete separable sections on said backing web, the perimeter forming means cutting the coated web after the respective slugs have been taken off by said take-off line.

16. Apparatus as set forth in claim 15, said apparatus further comprising breaker edge means positioned adjacent to the intake of said take-off line, said breaker edge means cooperating with said coated web and said backing web to peel back at least a leading edge of said slug from said web as said web moves across said breaker edge.

17. Apparatus as set forth in claim 16, said air flow also functioning to aid in carrying said slug through said take-off line.

18. Apparatus as set forth in claim 16, said apparatus further comprising metering means connected with said adhesive deadener means for metering said adhesive deadening substance into said air flow at a rate sufficient to prevent substantial sticking of said slugs to said take-off line.

* * * * *